United States Patent [19]
Shibata

[11] Patent Number: 5,950,976
[45] Date of Patent: Sep. 14, 1999

[54] GLASS HOLDING DEVICE

[75] Inventor: Yuuji Shibata, Toyota, Japan

[73] Assignee: Nifco Inc., Yokohama, Japan

[21] Appl. No.: 09/020,243

[22] Filed: Feb. 6, 1998

[30] Foreign Application Priority Data

Mar. 17, 1997 [JP] Japan .................................. 9-062603

[51] Int. Cl.[6] .................................................. A47K 5/00
[52] U.S. Cl. ...................... 248/309.1; 248/549; 52/208; 296/93
[58] Field of Search ................................ 248/309.1, 503, 248/549, 548, 900; 52/208; 296/93, 96.21, 146.15; 264/254

[56] References Cited

U.S. PATENT DOCUMENTS

| | | | |
|---|---|---|---|
| 4,648,222 | 3/1987 | Miyata et al. | 52/208 |
| 4,884,380 | 12/1989 | Yada et al. | 52/208 |
| 4,890,431 | 1/1990 | Katayama | 52/208 |
| 4,905,432 | 3/1990 | Romie | 52/208 |
| 4,916,873 | 4/1990 | Keys | 52/208 |
| 5,001,876 | 3/1991 | Harper et al. | 52/208 |
| 5,009,642 | 4/1991 | Katcherian | 296/201 |
| 5,016,850 | 5/1991 | Plahn | 248/206.3 |
| 5,085,021 | 2/1992 | Kunert | 52/208 |
| 5,112,101 | 5/1992 | Katcherian et al. | 296/201 |
| 5,190,338 | 3/1993 | Yada | 296/93 |
| 5,261,718 | 11/1993 | Ohlenforst et al. | 296/96.21 |
| 5,528,868 | 6/1996 | Yada et al. | 52/208 |
| 5,584,526 | 12/1996 | Soldner | 296/146.15 |
| 5,688,016 | 11/1997 | Gold | 296/93 |
| 5,711,119 | 1/1998 | Cornils et al. | 52/208 |
| 5,771,652 | 6/1998 | Nagata et al. | 52/716.5 |
| 5,776,403 | 7/1998 | Yada et al. | 264/259 |
| 5,833,297 | 11/1998 | Yada et al. | 296/93 |

*Primary Examiner*—Derek J. Berger
*Assistant Examiner*—Tan Le
*Attorney, Agent, or Firm*—Kanesaka & Takeuchi

[57] ABSTRACT

A glass holding device of the invention is provided for easily attaching and positioning a glass plate to an upper flange. The glass holding device includes a stopper base to be attached to the upper flange, and a stopper to be attached to the glass plate. The stopper base includes a fitting hole for receiving a rising wall of the upper flange therein, a first engaging portion situated at a side near the fitting hole, and an abutment portion situated at a lower side of the fitting hole to support a lower side of the upper flange when the stopper base engages the upper flange. The stopper includes a base portion attached to the glass plate, a leg extending downwardly from the base portion, and a second engaging portion formed at a distal end of the leg. The second engaging portion engages the first engaging portion to hold the glass plate.

6 Claims, 5 Drawing Sheets

GLASS HOLDING DEVICE

BACKGROUND OF THE INVENTION AND RELATED ART STATEMENT

The present invention relates to a glass holding device for temporarily holding a glass, such as a windshield glass, until an adhesive is solidified when the glass is fixed by the adhesive to cover an open section of an automobile body.

FIG. 5 shows a sectional view showing an example of a conventional glass holding device.

In FIG. 5, numeral 1 designates an automobile body, wherein in an upper flange 3 defining an open section 2, there is formed a protrusion 4 projecting downwardly to attach a stopper base 21, which is described later.

Numeral 11 designates a glass, for example, a windshield glass, for covering the open section 2.

Numeral 21 designates a stopper base attached to the upper flange 3. The stopper base is U-shaped in a side view, and is formed of a lower holding piece 22 and an upper holding piece 24. The lower holding piece 22 has an opening 23, through which the protrusion 4 enters. A rim of the opening 23 engages the protrusion 4.

Also, in the upper holding piece 24, there is provided a stopper piece 25 formed by cutting a part of the upper holding piece 24 and bending the part upwardly. Incidentally, an opening 26 is formed in the stopper piece 25.

Numeral 31 designates a stopper, which has an upper surface fixed to an upper rim of a rear surface of the windshield glass 11 by an adhesive or adhering agent, and the stopper 31 is provided on the surface abutting against the stopper piece 25 with a projection 32 entering into the opening 26. And, the lower surface of the projection 32 has an inclined guide surface.

Numeral 51 designates a molding or sealing for covering a space between the body 1 and the windshield glass 1.1.

Next, an attachment of the glass holding device and temporarily holding the windshield glass will be explained hereunder.

Firstly, the upper flange 3 is placed between the lower holding piece 22 and the upper holding piece 24, and the stopper base 21 is pushed to the upper flange 3. As a result, the lower holding piece 22 passes over the protrusion 4 by its elasticity and the protrusion 4 enters into the opening 23. Therefore, by contacting the rim of opening 23 with the protrusion 4, the stopper base 21 can be positioned and attached to the upper flange 3.

Then, the stopper 31 is fixed to the upper rim on the rear surface side of the windshield glass 11 by the adhesive or the adhering agent.

Under the condition that the stopper base 21 is attached to the upper flange 3 and the stopper 31 is fixed to the windshield glass 11 as described above, the bottom surface of the stopper 31 is placed on the stopper piece 25 and then the windshield glass 11 is moved so as to slidingly transfer the bottom surface of the stopper 31 on the stopper piece 25. The projection 32 is guided by the guide surface and enters into the opening 26 from the upper side.

Incidentally, since the projection 32 enters into the opening 26 and the upper surface of the projection 32 abuts against the stopper piece 25 constituting the upper rim of the opening 26, floating or upward movement of the windshield glass 11 is prevented.

Also, since the stopper 31 and the stopper piece 25 contact with each other at the respective surfaces, a position of the windshield glass 11 in the arrow direction can be set or defined by its own weight of the windshield glass 11.

Since the windshield glass 11 can be positioned at the open section 2 by the stopper base 21 and the stopper 31 as described above, when the windshield glass 11 is positioned after it is arranged such that a dam rubber and an adhesive, not shown in the figure, are located between the upper flange 3 and the windshield glass 11, the windshield glass 11 can be tentatively held by the glass holding device until the adhesive is solidified.

Also, in order to cover or fill the space between the automobile body 1 and the windshield glass 11, the molding or sealing 51 is fitted.

The aforementioned glass holding device has been disclosed, for example, in Japanese Utility Model Registration Publication No. 2522652.

The conventional glass holding device has elasticity, and the upper and lower holding pieces 24, 22 hold the upper flange 3 so that the stopper base 21 is attached to the upper flange 3. Therefore, weight of the windshield glass 11 is applied to the stopper piece 25 in the arrow direction, so that the upper holding piece 24 and the stopper piece 25 rotate in the counterclockwise direction.

As stated above, when the upper holding piece 24 and the stopper piece 25 rotate in the counterclockwise direction, the windshield glass 11 can not be positioned at the predetermined place.

Thus, in order to position the windshield glass 11 at the predetermined place by improving the strength of the stopper base 21, if the thicknesses of the respective portions are increased to enhance the strength, it becomes difficult to bend the upper and lower pieces 24, 22 and to sandwich the upper flange 3 between the upper and lower pieces 24, 22. Thus, in this case, there is a problem that the attachment of the stopper base 21 to the upper flange 3 becomes difficult.

The present invention has been made to solve the aforementioned problem, and an object of the invention is to provide a glass holding device, wherein a stopper base can be attached easily.

Another object of the invention is to provide a glass holding device as stated above, wherein the glass plate can be positioned at a predetermined place.

Further objects and advantages of the invention will be apparent from the following description of the invention.

SUMMARY OF THE INVENTION

In a glass holding device of the present invention, an engaging and stopping portion of a stopper base is attached to an upper flange constituting an open section, which is covered by a glass plate, of an automobile body. The engaging and stopping portion is engaged with an engaging portion disposed at a distal end of a leg extending from a base portion fixed to a rear surface of the glass plate. Further, the stopper base is provided with a fitting hole, into which a rising wall formed upwardly in the upper flange is fitted, and an abutment portion which abuts against the rear surface of the upper flange under a condition where the rising wall is fitted into the fitting hole while the stopper base is rotated.

Preferably, the engaging and stopping portion is formed at a portion of the stopper base such that the engaging and stopping portion is located upper than the rising wall and pressed against the rising wall.

DETAILED DESCRIPTION OF A PREFERRED EMBODIMENT

Figure 1:
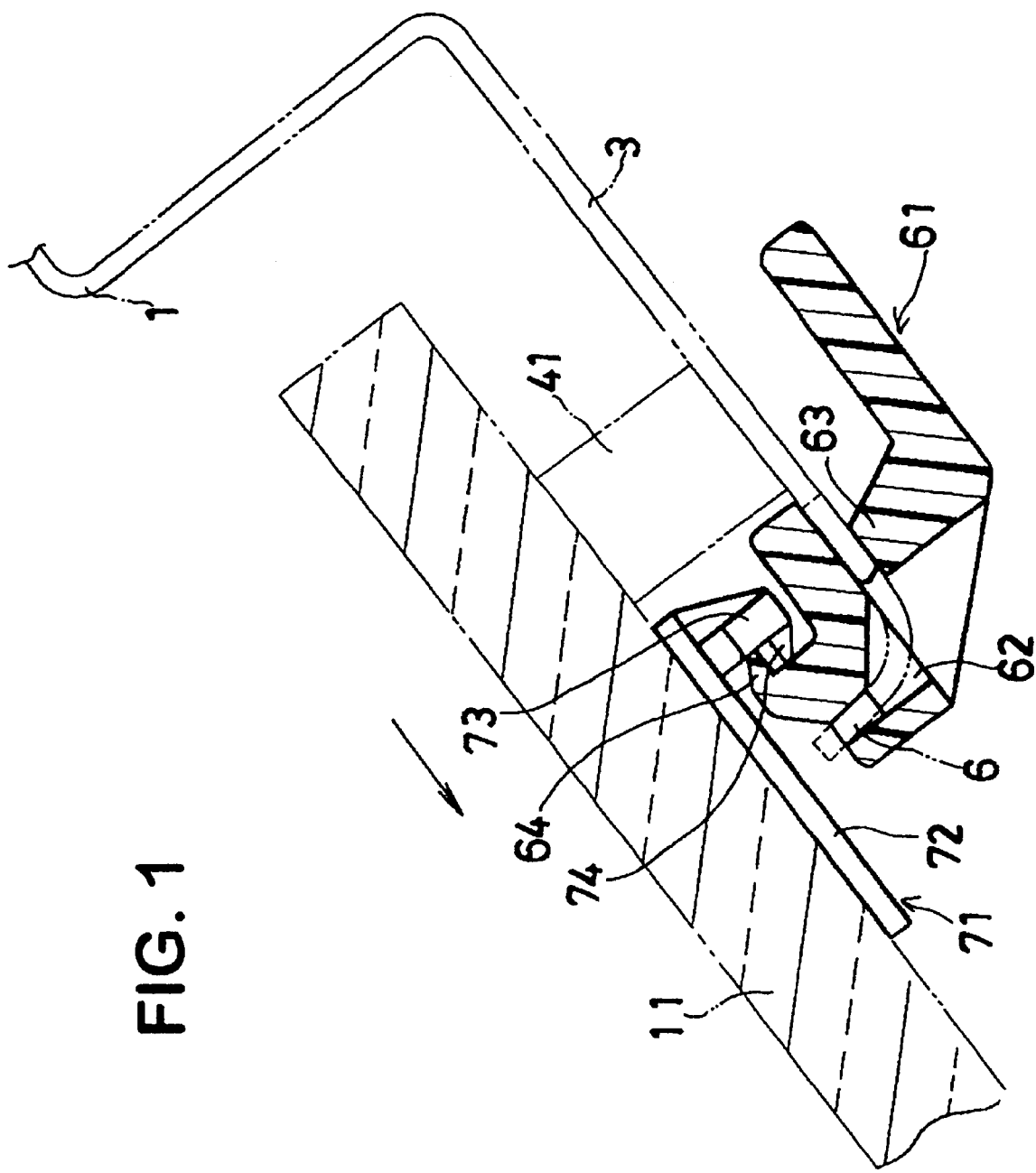
FIG. 1 is an explanatory view corresponding to a partly cut side view of a glass holding device showing an embodiment of the invention.

Hereinafter, an embodiment of the invention will be explained by referring to the drawings.

Figure 2:
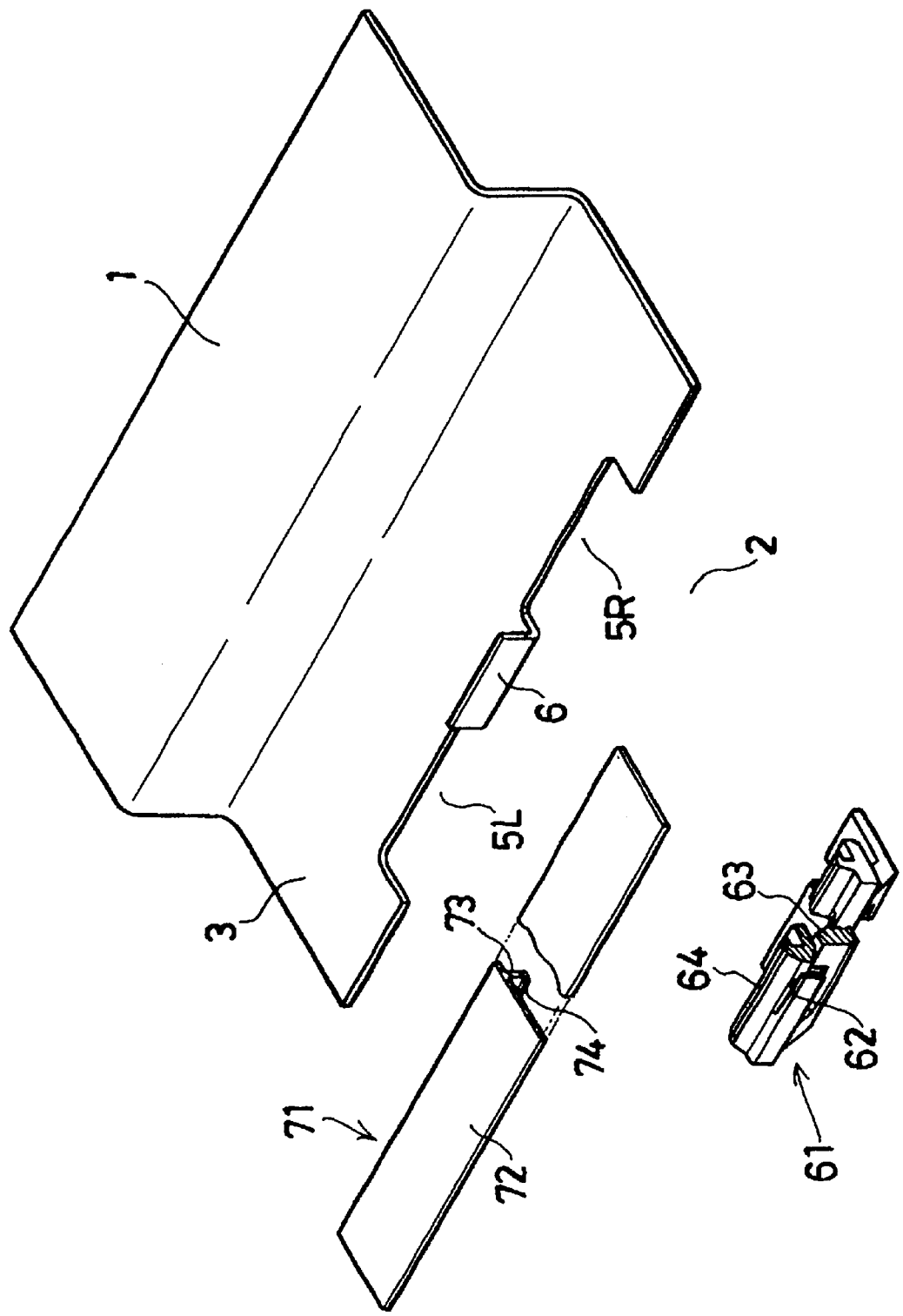
FIG. 2 is an exploded perspective view in which the glass holding device is partly cut.
Figure 3A:
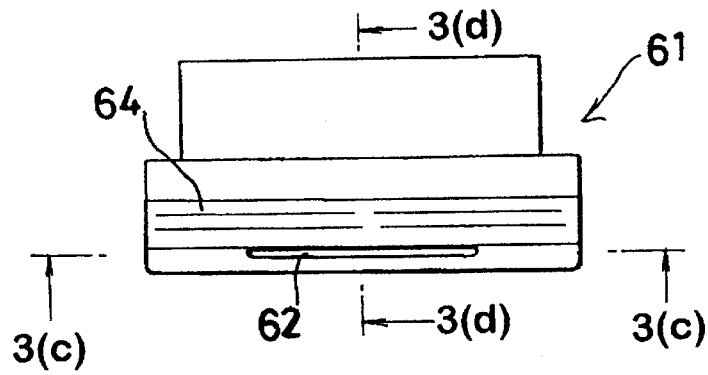
FIG. 3(a) is an enlarged plan view of a stopper base.
Figure 3B:
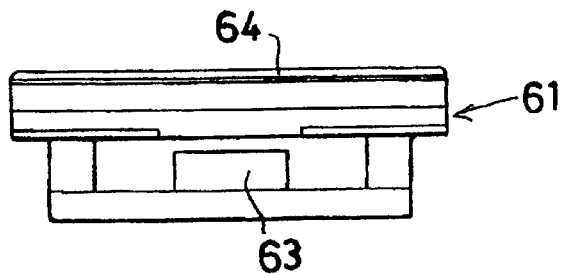
FIG. 3(b) is a front view of the stopper base as seen from an upper side in FIG. 3(a)
Figure 3C:
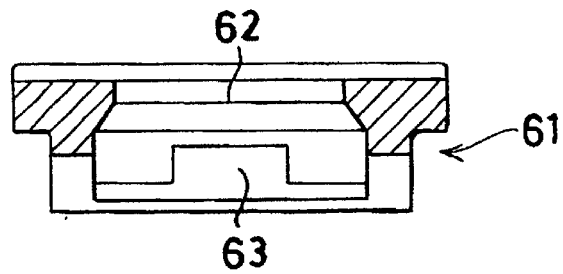
FIG. 3(c) is a cross sectional view taken along line 3(c)—3(c) in FIG. 3(a)
Figure 3D:
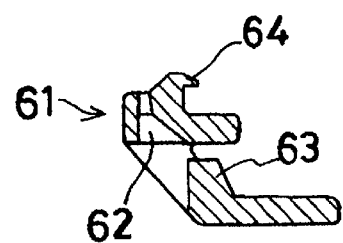
FIG. 3(d) is a cross sectional view taken along line 3(d)—3(d) in FIG. 3(a)
Figure 4A:
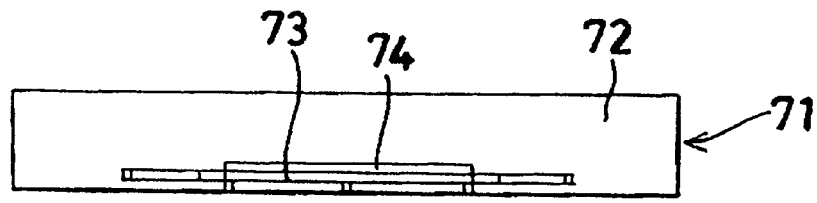
FIG. 4(a) is a bottom plan view of the stopper base.
Figure 4B:
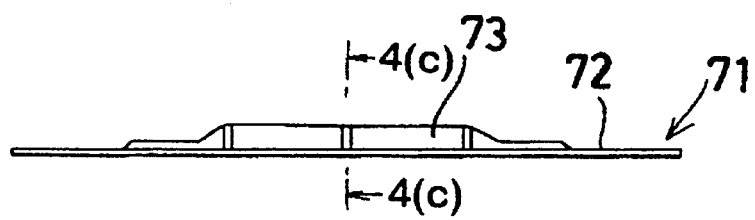
FIG. 4(b) is a top plan view of the stopper base as seen from a lower side in FIG. 4(a)
Figure 4C:
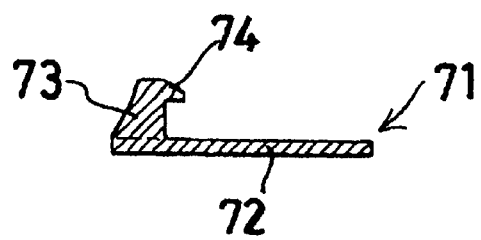
FIG. 4(c) is a cross sectional view taken along line 4(c)—4(c) in FIG. 4(b)
Figure 5:
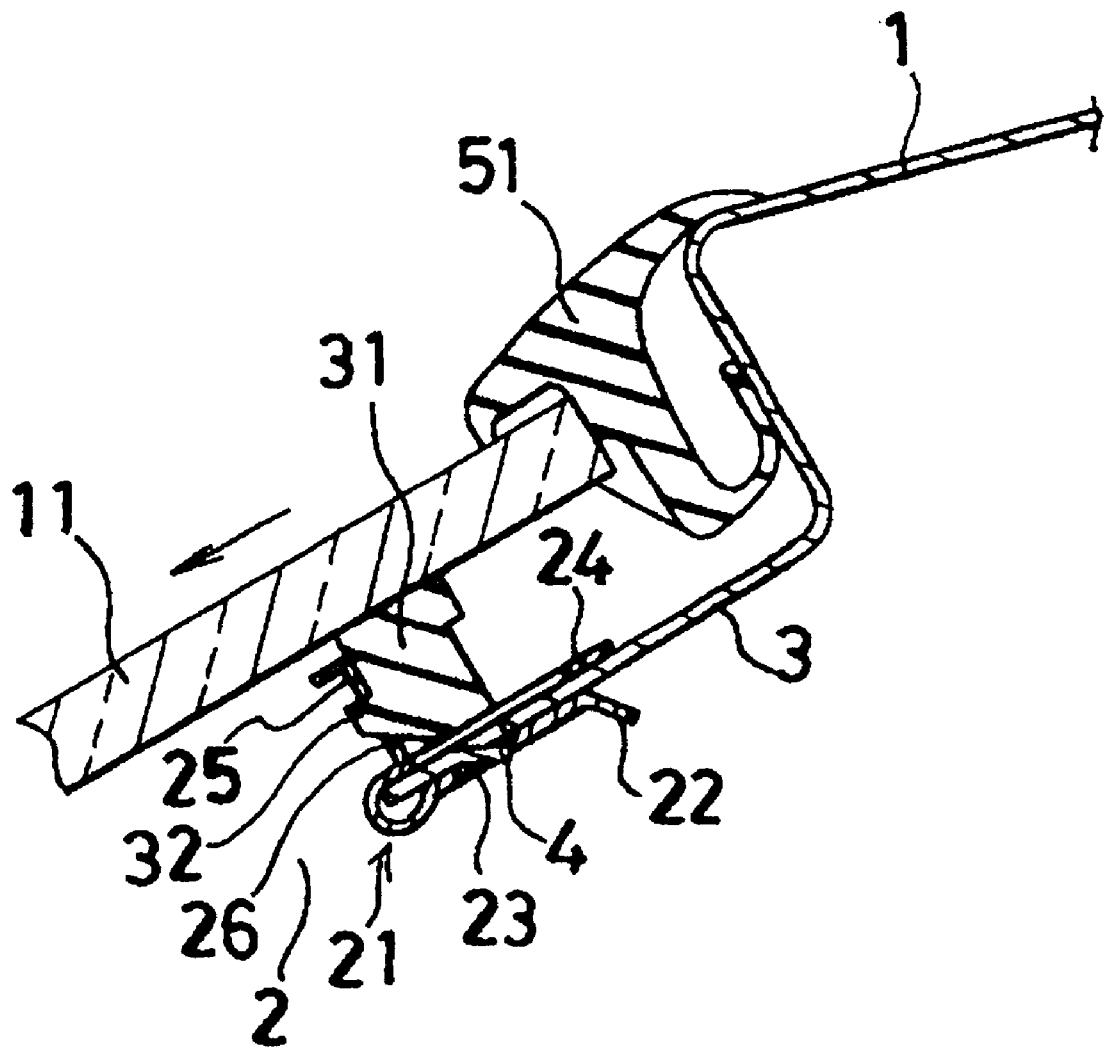
FIG. 5 is a sectional view of a conventional glass holding device.

FIG. 1 is a partly cut explanatory side view of a glass holding device showing an embodiment of the invention; FIG. 2 is an exploded perspective view in which the glass holding device is partly cut; FIG. 3(a) is an enlarged plan view of a stopper base;

FIG. 3(b) is a front view of the stopper base as seen from an upper side in FIG. 3(a); FIG. 3(c) is a cross sectional view taken along line 3(c)—3(c) in FIG. 3(a); FIG. 3(d) is a cross sectional view taken along line 3(d)—3(d) in FIG. 3(a); FIG. 4(a) is a bottom plan view of the stopper base; FIG. 4(b) is a top plan view of the stopper base as seen from a lower side in FIG. 4(a); and FIG. 4(c) is a cross sectional view taken along line 4(c)—4(c) in FIG. 4(b). Constituents corresponding to or same as those of the conventional glass holding device in FIG. 5 are designated by the same numerals, and explanations thereto are omitted herewith.

In these figures, numerals 5L, 5R designate notches formed at a lower side of an upper flange 3, and numeral 6 designates a rising or upstanding wall formed in the upper flange 3. The rising wall 6 is formed by upwardly bending a portion of the upper flange 3 between the notches 5L, 5R.

Numeral 41 designates a dam rubber, which is fixed to a rear surface of the windshield glass 11 by an adhesive or an adhering agent, and is provided for holding the adhesive or the like for attaching the windshield glass 11 to the upper flange 3, so that the adhesive does not flow to places unnecessary for adhering.

Numeral 61 designates a plastic stopper base, and is provided with a fitting hole 62 into which the rising wall 6 is fitted, and an abutment portion 63 abutting against a rear surface of the upper flange 3 in a condition that the rising wall 6 is fitted into the fitting hole 62 while the stopper base is rotated.

At a portion of the stopper base 61 which is located upper than the rising wall 6 and pressed against the rising wall 6, there is disposed an engaging and stopping portion 64 for engaging and holding an engaging portion 74 of a stopper 71, described later.

Numeral 71 designates a stopper or plastic stopper, which is formed of a base portion 72 having an upper surface fixed to the rear surface of the windshield glass 11 by an adhesive or an adhering agent, a leg 73 extending downwardly from the base portion 72, and the engaging portion 74 for engaging the engaging and stopping portion 64 of the stopper base 61.

Next, an attachment of the glass holding device and tentatively holding the windshield will be explained.

Firstly, the abutment portion 63 of the stopper base 61 is oriented downwardly, and the abutment portion 63 is placed to be able to abut against a rear portion of the rising wall 6, which extends to the rear surface of the upper flange 3.

Then, the rising wall 6 is fitted into the fitting hole 62 while the stopper base 61 is rotated, as shown in FIG. 1. Thus, the stopper base 61 can be attached to the rising wall 6.

As described above, when the stopper base 61 is attached to the rising wall 6, it comes to a condition such that the rising wall 6 is held by the stopper base 61 at both surfaces thereof, and the abutment portion 63 abuts against the rear surface of the upper flange 3.

Further, an upper surface of the base portion 72 of the stopper 71 is fixed by the adhesive or the adhering agent to the upper rim of the rear surface side of the windshield glass 11, and on the rear surface side of the windshield glass 11, the dam rubber 41 is fixed to the rim outside the stopper 71 by the adhesive or the adhering agent.

Under a condition where the stopper base 61 is attached to the rising wall 6 and the dam rubber 41 and the stopper 71 are fixed to the windshield 11 as described above, a bottom surface of the dam rubber 41 is placed on the upper flange 3 and the windshield 11 is moved to an arrow direction in the figure so as to engage the engaging and stopping portion 64 with the engaging portion 74. As a result, the windshield 11 can be tentatively held.

Incidentally, the windshield 11 can be positioned at the open section 2 by the stopper base 61 and the stopper 71. Thus, when the windshield 11 is positioned after the adhesive, not shown in the figure, is applied between the upper flange 3 and the windshield 11, the windshield 11 can be temporarily held by the glass holding device until the adhesive is solidified or hardened.

As described above, according to the present invention, since the stopper base is provided with the fitting hole into which the rising wall formed at the upper flange to extend upwardly is inserted, the stopper base can be attached to the rising wall easily.

Further, when the stopper base is attached to the rising wall, the abutment portion abuts against the rear surface of the upper flange, so that the abutment portion can prevent the stopper base from rotating by the weight of glass. Thus, the glass plate can be positioned at the predetermined place.

Furthermore, since the engaging and stopping portion is provided at a portion of the stopper base which is located upper than the rising wall and pressed against the rising wall, the engaging and stopping portion can be positioned precisely. Accordingly, the glass plate can be positioned with higher accuracy.

While the invention has been explained with reference to the specific embodiment of the invention, the explanation is illustrative and the invention is limited only by the appended claims.

What is claimed is:

1. A glass holding device adapted to hold a glass plate on an upper flange with horizontal and rising walls, comprising:

a stopper base to be attached to an upper flange, said stopper base including a fitting hole adapted to receive a rising wall of the upper flange therein, a first engaging portion situated at a side near the fitting hole, and an abutment portion situated at a lower side of the fitting hole adapted to support a lower side of the upper flange when the stopper base engages the upper flange, and a stopper including a base portion adapted to be attached to a glass plate, a leg extending downwardly from the base portion, and a second engaging portion formed at a distal end of the leg, said second engaging portion engaging the first engaging portion to hold the glass plate.

2. A glass holding device according to claim 1, wherein said first engaging portion is located at a portion of the stopper base higher than the rising wall, said first engaging portion being pressed toward the rising wall.

3. A glass holding device according to claim 1, wherein said fitting hole includes a horizontal section and vertical section communicating with each other adapted to receive therein a horizontal wall and the rising wall of an upper flange, respectively.

4. A glass holding device according to claim 3, wherein said fitting hole further includes an enlarged intersection between the horizontal and vertical sections to allow the rising wall of the upper flange to easily enter into the vertical section through the horizontal section.

5. A glass holding device according to claim 4, wherein said abutment portion is located under the horizontal section.

6. A glass holding device according to claim 5, wherein the horizontal and vertical sections of the fitting hole have same sizes which do not substantially change when the upper flange is inserted.

* * * * *